J. W. MARSALIS.
THILL TUG.
APPLICATION FILED SEPT. 14, 1911.
1,017,303.
Patented Feb. 13, 1912.
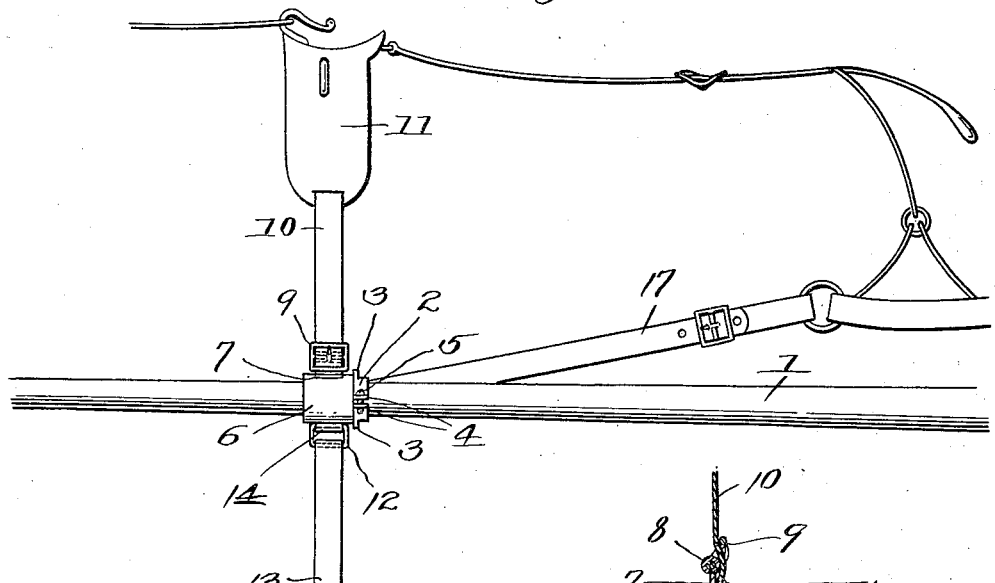
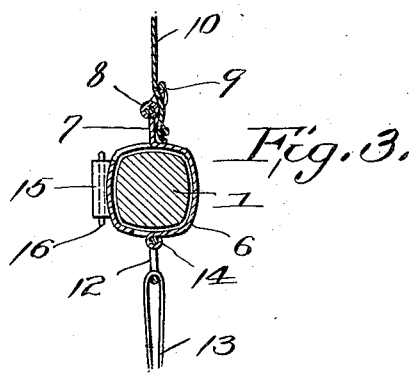
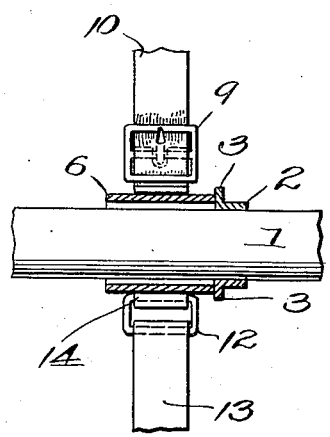
WITNESSES
INVENTOR
J. W. Marsalis
Attorney

UNITED STATES PATENT OFFICE.

JAMES W. MARSALIS, OF HATTIESBURG, MISSISSIPPI.

THILL-TUG.

1,017,303.     Specification of Letters Patent.     Patented Feb. 13, 1912.

Application filed September 14, 1911. Serial No. 649,237.

*To all whom it may concern:*

Be it known that I, JAMES W. MARSALIS, citizen of the United States, residing at Hattiesburg, in the county of Forest and State of Mississippi, have invented certain new and useful Improvements in Thill-Tugs, of which the following is a specification.

The present invention relates to certain new and useful improvements in thill tugs for vehicles, the object of the invention being to provide a device of this character which is simple and inexpensive in its construction, which admits of the hold-back strap being quickly attached to the shaft or detached therefrom without wrapping it around the same in the usual manner, and which will readily slip over the end of the shaft and become detached therefrom in the event the traces should break and leave the animal otherwise free.

A further object of the invention is to provide a device of this character which can be readily placed upon the shafts of any vehicle and employed in connection with the usual harness.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation showing the manner in which the thill tug is applied. Fig. 2 is an enlarged view of Fig. 1, the sleeve and stop collar being shown in section. Fig. 3 is a transverse sectional view through the device. Fig. 4 is a detail view of the stop collar, and Fig. 5 is a detached perspective view of the sleeve.

Corresponding and like parts are referred to in the following description and indicated in all the views of the drawings by the same reference characters.

Specifically describing the present embodiment of the invention, the numeral 1 designates a shaft which may be of the usual construction. This shaft is provided at a suitable point in the length thereof with a stop collar 3 which is preferably provided at the top and bottom thereof with the stop flanges 3. This collar is preferably split, the ends thereof being extended outwardly on the outside of the shaft, as indicated at 4, and connected by a clamping screw 5. It will be observed that the inside of the stop collar is smooth, all projections which might injure the holdback strap or rub against the sides of the draft animal being avoided. This stop collar may be readily formed from sheet metal, and can be quickly slipped upon any shaft and rigidly clamped in any desired position thereon.

A sleeve 6 is slipped loosely over the end of the shaft so as to abut against the stop collar when in normal position. This sleeve is preferably formed of sheet metal, and a tongue 7 projects upwardly from the central portion thereof. This tongue is stamped from the sleeve and bent upwardly therefrom, the upper end of the tongue being bifurcated and the arms of the bifurcation being returned at 8 for engagement with the cross bar of the buckle 9. This buckle is designed to engage the strap 10 which is pendent from the harness saddle 11. The bottom of the sleeve 6 is provided with an elongated loop 12 to which the upper end of the belly band 13 is connected. This loop has one side thereof received within a roll or elongated eye 14 formed by stamping a tongue from the sleeve and suitably bending the same.

The inner side of the sleeve is provided at each end thereof with a vertically disposed roll or eye 15. These eyes may be conveniently formed by rolling tongues at the ends of the sleeve, and each of the eyes engages an upright loop 16. The rear loop is designed to have the holdback strap 17 attached thereto, and by providing one of these loops at each end of the sleeve, the necessity of constructing sleeves in rights and lefts is avoided. In other words, the sleeve can be readily reversed and placed upon the opposite shaft without the necessity of making any changes or adjustments.

With the foregoing construction the holdback strap can be quickly attached or detached from the shaft, and there is no necessity for wrapping the same around the shaft in the usual awkward and time consuming manner. This device has the further advantage of tending to prevent accidents, since the sleeve 6 will slip readily over the forward end of the shaft should the horse become otherwise detached from the vehicle.

Having thus described the invention, what I claim as new and desire to secure by Letters Patent, is:—

1. A thill tug, including a sheet metal sleeve adapted to be fitted upon a shaft, the said sleeve being provided at one end thereof with a tongue which is rolled rearwardly to form an eye and having tongues stamped from the top and bottom thereof, the lower tongue being rolled to form an eye while the upper tongue is bent upwardly, a buckle engaged by the end of the upper tongue and adapted to receive the saddle strap, a loop engaging the eye at the bottom of the sleeve and adapted to engage the belly band, and a loop engaging the eye at the end of the sleeve and adapted to engage the holdback strap.

2. A thill tug, including a reversible sheet metal sleeve adapted to be fitted removably over the end of a shaft, opposite ends of the sleeve being provided upon the inner side thereof with tongues which are rolled to provide vertically disposed eyes, and tongues being stamped from the top and bottom of the sleeve, the lower tongue being rolled to form a horizontally disposed eye while the upper tongue is bent upwardly and has the end thereof bifurcated, a buckle adapted to engage the saddle strap and having the middle cross bar thereof engaged by the arms of the bifurcation of the upper tongue, a loop engaged by the bottom eye and adapted to receive the belly band, and loops engaging the eyes at the ends of the sleeve, the rear loop being adapted to receive the holdback strap.

In testimony whereof I affix my signature in presence of two witnesses.

JAMES W. MARSALIS.

Witnesses:
H. C. GREER, Jr.,
J. S. LOVE.

---

Copies of this patent may be obtained for five cents each, by addressing the "Commissioner of Patents, Washington, D. C."